United States Patent

Sheehan et al.

[15] 3,658,566
[45] Apr. 25, 1972

[54] TITANIUM OXIDE PIGMENTS

[72] Inventors: Gerard Martin Sheehan; George Leathwhite Roberts, Jr., both of Lynchburg, Va.; Paul Montgomery Dupree, Basking Ridge, N.J.

[73] Assignee: American Cyanamid Company, Stamford, Conn.

[22] Filed: Aug. 7, 1969

[21] Appl. No.: 848,353

Related U.S. Application Data

[63] Continuation-in-part of Ser. No. 625,618, Mar. 24, 1967.

[52] U.S. Cl. ........................ 106/300, 106/308 B, 106/308 N, 260/41 B
[51] Int. Cl. ............................................................. C09c 1/36
[58] Field of Search ........................................ 106/300, 308 B

[56] References Cited

UNITED STATES PATENTS

| | | | |
|---|---|---|---|
| 3,035,966 | 5/1962 | Siuta | 106/300 X |
| 3,345,187 | 10/1967 | Binnis | 106/300 X |
| 3,383,231 | 5/1968 | Allan | 106/300 |
| 3,410,708 | 11/1968 | McGinnis | 106/300 |
| 3,437,502 | 4/1969 | Werner | 106/300 |
| 3,449,271 | 6/1969 | O'Connor et al. | 106/300 |

Primary Examiner—Tobias F. Levow
Assistant Examiner—H. M. S. Sneed
Attorney—Roland A. Dexter

[57] ABSTRACT

The production of pigmentary $TiO_2$ of improved properties by treatment of $TiO_2$ with combined oxides of silicon and aluminum, the oxides being used in a weight ratio of 5–6 and in a concentration such that the pigment will have at least 0.5 percent by weight of oxide coating.

4 Claims, No Drawings

TITANIUM OXIDE PIGMENTS

This application is a continuation-in-part of application Ser. No. 625,618, filed Mar. 24, 1967.

This invention relates to improved pigmentary titanium dioxide. It relates further to $TiO_2$ pigments of enhanced physical properties, including brightness, ease of dispersibility, and color tone, for use in enamels, latex paints and other plastic substrates, especially vinyl asbestos tiles. More particularly, the present invention relates to a process for treating finely divided hydroclassified $TiO_2$ with a specially proportioned combination of hydrous oxides of silicon and aluminum whereby pigmentary $TiO_2$ of the above-defined nature is obtained.

It is known that $TiO_2$ pigmented resinous materials can be stabilized by the use of pigment coated with hydrous oxides of silicon and aluminum. This is disclosed in U.S. Pat. No. 3,035,966, issued May 22, 1962, as a means of improving the resistance of pigmented resins, especially paper laminates, to discoloration by sunlight. In accordance with the patent, the preferred way of preparing the stabilized pigmented resinous compositions is by admixing a slurry of the $TiO_2$ pigment and the two hydrous oxides in a ratio such that from 1-2 moles of alumina are present for each mole of silica and the combination of hydrous oxides is in a concentration equal to 2-15 percent of the weight of the $TiO_2$. The use of equimolar amounts of silica and alumina is shown to give the greatest protection of any other silica-alumina combination although the effectiveness of a given mixture of hydrous oxides seemed from the data to depend upon the concentration of hydrous oxides in the coating composition. At any rate, relatively high percentages of hydrous oxides were used to attain the sought-after light stability.

It is an object of the present invention to provide a method of improving the usefulness of $TiO_2$ pigment in plastic applications where brightness and ease of dispersibility are important considerations in addition to the conventionally recognized need for good light fastness. It is a further object of this invention to provide $TiO_2$ pigment of enhanced physical characteristics as prepared by the process of the present invention.

In accordance with this invention, these and other objects are achieved by treating $TiO_2$ particles with a mixture of hydrous oxides of silicon and aluminum in a proportion such that at least about four parts of silica are used for each part of alumina and in an amount such that the treatment with the combined oxides employs at least 0.5 weight percent based on the weight of the untreated $TiO_2$. The ratio of silica to alumina, preferably, should be in the range of about 5-6 parts of silica based on the weight of alumina. It is critical, however, that at least about 0.5 percent of silica be employed in treating the $TiO_2$. When less than this percent is used, it is found that brightness of the final pigmentary material is reduced considerably. Thus, in accordance with the present invention, the improved $TiO_2$ pigment must contain a minimum concentration of silica and a definite amount of alumina, the amount being proportioned on the concentration of silica. Surprisingly, both enhanced brightness and color tone are obtainable only under the critically defined proportions and concentrations discovered in accordance with the present invention. When, for example, a given amount of silica is present in the $TiO_2$ composition, the degree of brightness may vary considerably depending upon the proportionate concentration of alumina. It is similarly surprising that the use of silica and alumina in a ratio of five or greater does not result in plastic compositions of desired brightness and color tone when the minimum concentration of silica required by this invention is not present in the final $TiO_2$ pigment.

This invention may be used to improve pigmentary $TiO_2$, either anatase or rutile structure, obtained by conventional methods involving calcination of titania hydrolysates (i.e., pigmentary $TiO_2$ from the "sulfate" process); or combustion of titanium tetrachloride (i.e., $TiO_2$ from the "chloride" process); or high temperature hydrolysis of titanium tetrachloride. From the above methods, an aqueous slurry of $TiO_2$ pigment is obtained at any desired solids content e.g., 15 percent to 30 percent by weight). In usual practice, the slurry is treated with a small amount of sodium hydroxide (0.05 percent by weight of $TiO_2$) or other dispersing agent for the purpose of deflocculation and is then hydroclassified by any convenient technique to eliminate particles coarser than about four microns. The hydroclassified particles thus obtained are subjected to treatment with hydrous oxides of silicon and aluminum whereby the $TiO_2$ pigment is improved in the aforementioned respects. Generally, treatment with the combined hydrous oxides may be followed immediately by dewatering; or first by aging at any temperature in the range of 5°–100° C. for periods up to about 24 hours and then dewatering. The dewatered oxide-treated $TiO_2$ is then washed substantially free of soluble salts and dried. The resulting cake can be broken up by conventional milling means. One especially suitable procedure for accomplishing this end is fluid energy milling as carried out in a Reductionizer or Micronizer with either air or super-heated steam at a temperature of above about 450° F. and under a pressure of about 100–175 p.s.i.g.

The hydrous alumina and silica can be incorporated with the $TiO_2$ by the formation of the hydrous oxides in situ. The procedure may be accomplished for example by the addition of an aluminum salt such as aluminum sulfate and a soluble silicate, followed by adjustment of pH whereby the hydrous alumina and silica are formed. When both the aluminiferous and siliceous materials have been added to the slurry of titanium dioxide pigment, the mixture may be conditioned by heating to any temperature in the range of room temperature to the boiling point of the mixture. Heating may be conducted for several hours although a period of 1-3 hours is adequate. After heating, the treated $TiO_2$ is filtered, washed substantially free of soluble salts and then dried. The dried pigment may be milled to the desired degree of sub-division by conventional means as aforementioned. Optionally, prior to milling, the $TiO_2$ pigment may be treated as disclosed in U.S. Pat. No. 3,015,573 for the purpose of improving dispersibility with materials such as triethanolamine and ethylhexoic acid.

Suitable sources of hydrous alumina are its water soluble salts which are readily hydrolyzable, such as aluminum sulfate, aluminum chloride and sodium aluminate. Representative sources of hydrous silica are soluble silicates, such as potassium, sodium, and ammonium, and silicic acid sols.

The improved $TiO_2$ pigment produced by the process of this invention is highly suitable for opacification of plastics, especially vinyl asbestos tile. To test the $TiO_2$ pigments obtained by the present invention, use has been made in the following examples of a Hunter Multi-purpose Reflectometer which determines the brightness and yellowness of samples to be tested. Yellowness is reported in the following examples as yellow factor which is determined by the following equation:

Yellow Factor $= (A-B)/G \times 100$ wherein $A$ = Amber Reflectance
$B$ = Blue Reflectance
$G$ = Green Reflectance Brightness was determined as the percent of green light reflected from the test sample when exposed to light from a green filter. A high yellow factor is indicative of undesirable color tone.

In several of the examples, a Hunter D–25 Color Difference Meter was used to determine the brightness as $R_D$ which is a measure of green reflectance, and the yellowness as $B_L$ of the test samples.

The following examples, in which parts and percentages are by weight unless otherwise specified, are presented to further illustrate the present invention.

The concentration of the hydrous oxides are based upon the weight of the $TiO_2$ to be treated and are expressed in terms of percent silica and alumina.

EXAMPLE 1

Samples of $TiO_2$ were prepared as follows and tested for brightness and yellowness. Results are reported in Table I.
Sample (1A)

To a hydro-classified slurry of rutile TiO$_2$ (700 parts) of about 20 percent solids, was added 0.2 percent SiO$_2$ as "N" brand (Philadelphia Quartz Company) sodium silicate with a SiO$_2$/Na$_2$O ratio of 3.22. The slurry was then heated to 70° C. and treated with aluminum sulfate solution, yielding a pH of 6.0 and an Al$_2$O$_3$ content of 0.03 percent. The slurry was then mixed for 2 hours at 70° C., filtered, washed substantially free of soluble salts and dried. After drying the pigment was fluid-energy milled for two passes in a 2 inch Reductionizer with steam at 500° F. and 120 p.s.i.g.

Sample (1B)

Same as Sample (1A) except 0.5 percent SiO$_2$ as "N" brand sodium silicate and 0.07 percent Al$_2$O$_3$ as aluminum sulfate were added to the TiO$_2$ slurry.

Sample (1C)

Same as Sample (1A) except 1.0 percent SiO$_2$ and 0.14 percent Al$_2$O$_3$ were added to the TiO$_2$ slurry.

TABLE I

| Sample | Percent SiO$_2$ | Percent Al$_2$O$_3$ | Ratio SiO$_2$/Al$_2$O$_3$ | Vinyl asbestos tile Hunter reflectometer | |
|---|---|---|---|---|---|
| | | | | Percent green brightness | Yellow factor |
| (1A) | 0.2 | 0.03 | 7 | 45.0 | 7.01 |
| (1B) | 0.5 | 0.07 | 7 | 45.3 | 6.68 |
| (1C) | 1.0 | 0.14 | 7 | 45.0 | 6.14 |

From the foregoing, it can be noted that Sample (1A) with a below-minimum concentration of SiO$_2$ was considerably yellower than the other two samples, although its brightness was satisfactory. Samples (1B) and (1C) with the same SiO$_2$/Al$_2$O$_3$ ratios were, nevertheless, bluer, i.e., less yellow. This example thus illustrates that by increasing the silica content the yellowness decreases while brightness remains essentially the same.

VINYL ASBESTOS TILE PROCEDURE

The vinyl asbestos tiles used in the examples were prepared by the following procedure using a vinyl asbestos tile compound plus a titanium dioxide concentration of 2 percent as follows:

| Vinyl asbestos compound | 196.0 parts |
|---|---|
| Titanium dioxide | 4.0 parts |
| | 200.0 parts |

The vinyl asbestos compound was banded on a Farrel 2 roll mill and the titanium dioxide added to the banded material while the rolls were turning.

Mill Conditions:
Roll Temperature:
  Front: 305° F. (72 p.s.i.)
  Back: Cool (water only) 2–4 p.s.i.
Nip Setting:
  5 —band
  15 —flux (10 passes)
  60 —calender (2 passes)
Roll Speed:
  Front: 46 f.p.m.
  Back: 32 f.p.m.
Molding (Compression) — No shims
  In juxtaposition
  Preheat 2 minutes (Farrel 4½ inch diameter ram)
  Increase pressure slowly to 11 tons (6 tons for individual tiles)
  Cool 7 minutes

EXAMPLE 2

Sample (2A)

To a hydro-classified slurry of rutile TiO$_2$ (700 parts) of about 20 percent solids, 0.1 percent Al$_2$O$_3$ was added as an aqueous aluminum sulfate solution. The slurry was heated to 70° C. and neutralized to pH 8.0 with "N" brand sodium silicate giving an SiO$_2$ content of 0.5 percent. After mixing 2 hours at 70° C., filtering and washing, the sample was repulped at about 40 percent solids and treated with 0.1 part each of triethanolamine and ethyl hexoic acid. The slurry was mixed one hour at 50° C. and filtered. After drying, the sample was twice passed through a 2 inch Reductionizer as in Example 1.

Sample (2B)

Same as (2A) except for addition of 0.2 percent Al$_2$O$_3$ and 1.0 percent SiO$_2$.

Sample (2C)

Same as (2A) except for addition of 0.3 percent Al$_2$O$_3$ and 1.5 percent SiO$_2$.

Sample (2D)

Same as (2A) except for addition of 0.4 percent Al$_2$O$_3$ and 1.70 percent SiO$_2$.

TABLE II

| Sample | Percent SiO$_2$ | Percent Al$_2$O$_3$ | Ratio SiO$_2$/Al$_2$O$_3$ | Vinyl asbestos tile Hunter reflectometer | |
|---|---|---|---|---|---|
| | | | | Percent green brightness | Yellow factor |
| (2A) | 0.5 | 0.1 | 5 | 44.3 | 6.65 |
| (2B) | 1.0 | 0.2 | 5 | 44.7 | 4.92 |
| (2C) | 1.5 | 0.3 | 5 | 44.8 | 4.47 |
| (2D) | 1.7 | 0.4 | 4.25 | 44.7 | 4.48 |

It can be seen from Table II that the effect of increasing hydrous oxide content while maintaining a SiO$_2$/Al$_2$O$_3$ ratio of five was to decrease yellow factor (i.e., increase blueness of color tone) of the subsequent tile. The trend was not continued for Sample (2D), because the SiO$_2$/Al$_2$O$_3$ ratio of five was not maintained.

EXAMPLE 3

Sample (3A)

To a hydroclassified slurry of rutile TiO$_2$ (700 parts) of about 20 percent solids, 1.8 percent Al$_2$O$_3$ was added as an aqueous aluminum chloride solution. The slurry was heated to 70° C. and neutralized to pH 7.0 with sodium hydroxide. After mixing 2 hours at 70° C., and filtering and washing, the sample was repulped at about 40 percent solids and treated with 0.1 percent each of triethanolamine and ethylhexoic acid. The slurry was mixed 1 hour at 50° C. and filtered. After drying, the sample was twice passed through a 2 inch Reductionizer.

Sample (3B)

To a hydroclassified slurry of rutile TiO$_2$ (700 parts) of about 20 percent solids, 0.3 percent Al$_2$O$_3$ as an aqueous aluminum sulfate, was added. The slurry was heated to 70°C. and "N" brand sodium silicate was added in an amount equivalent to 0.6 percent SiO$_2$. The pH was then adjusted to 4.0 with NaOH. After mixing 2 hours at 70° C., and filtering and washing, the cake was repulped at about 40 percent solids, and treated with 0.1 percent each of triethanolamine and ethylhexoic acid. The slurry was mixed 1 hour at 50° C., and filtered. After drying, the sample was twice passed through a 2 inch Reductionizer.

Sample (3C)

Same as (3B) but for addition of 0.9 percent SiO$_2$.

Sample (3D)

Same as (3B) but for addition of 1.2 percent SiO$_2$ and of HCl to maintain a pH of 4.0.

Sample (3E)

Same as (3B) but for addition of 1.5 percent SiO$_2$ and of HCl to maintain a pH of 4.0.

TABLE III

| Sample | Percent SiO$_2$ | Percent Al$_2$O$_3$ | SiO$_2$/Al$_2$O$_3$ | Vinyl asbestos tile Hunter D-25 color diff. meter | |
|---|---|---|---|---|---|
| | | | | R$_D$ | B$_L$ |
| (3A) | | 1.8 | | 42.0 | 4.3 |
| (3B) | 0.6 | 0.3 | 2 | 42.6 | 4.2 |
| (3C) | 0.9 | 0.3 | 3 | 42.5 | 4.2 |
| (3D) | 1.2 | 0.3 | 4 | 42.3 | 4.3 |
| (3E) | 1.5 | 0.3 | 5 | 43.0 | 4.1 |

Pigment Sample (3E) of this invention is capable of giving the same level of tile brightness obtainable with about 7 percent more of pigment Sample (3A). Thus, pigment Sample (3E) of this invention is significantly more efficient and economical to use.

EXAMPLE 4

Sample (4A)

To a hydroclassified slurry of rutile $TiO_2$ (700 parts) of 20 percent solids, 0.3 percent $Al_2O_3$ as aluminum sulfate, was added. The slurry was heated to 70° C. and neutralized to pH 7.0 with sodium hydroxide. After mixing 2 hours at 70° C. and filtering and washing the sample was repulped at about 40 percent solids and treated with 0.1 percent each of triethanolamine and ethylhexoic acid. The slurry was mixed 1 hour at 50° C. and filtered. After drying, the sample was twice passed through a 2-inch Reductionizer as in Example 1, Sample (1A).

Sample (4B)

To a hydroclassified slurry of rutile $TiO_2$ (700 parts) of about 20 percent solids, 0.2 percent $Al_2O_3$ as aluminum sulfate and 0.25 percent of 10 percent HCl were added. The slurry was heated to 70° C., and "N" brand sodium silicate ($SiO_2/Na_2$ 3.22 and 10 percent $SiO_2$) was then added to pH 4.0, yielding a 1.2 percent $SiO_2$ concentration. After mixing 2 hours at 70° C. and filtering and washing, the sample was repulped at about 40 percent solids treated with 0.1 percent each of triethanolamine and ethylhexoic acid and completed as for Sample (4A).

The samples were incorporated into vinyl asbestos, molded into tiles and analyzed for brightness and yellowness. The results are given in the following table.

TABLE IV

| Sample | Percent $SiO_2$ | Percent $Al_2O_3$ | $SiO_2/Al_2O_3$ | Vinyl asbestos tile Hunter D-25 color diff. meter | |
|---|---|---|---|---|---|
| | | | | $R_D$ | $B_L$ |
| (4A) | | 0.3 | | 44.6 | 3.5 |
| (4B) | 1.2 | 0.2 | 6 | 44.9 | 3.1 |

EXAMPLE 5

To a hydroclassified slurry of rutile $TiO_2$ (700 parts) of about 20 percent solids, 0.2 percent $Al_2O_3$ was added as an aqueous aluminum chloride solution and silicic acid sol was then added to a 1.2 percent $SiO_2$ level. The slurry was heated to 70° C. and neutralized to pH 7.0 with sodium hydroxide. After mixing 2 hours at 70° C., and filtering and washing, the sample was repulped at about 40 percent solids and treated with 0.1 percent each of triethanolamine and ethylhexoic acid. The slurry was mixed 1 hour at 50° C. and filtered. After drying, the sample was twice passed through a 2 inch Reductionizer. The silicic acid was prepared by passing "N" brand sodium silicate diluted to about 50 g./l. $SiO_2$ through a column of Dowex 50 cation exchange resin in its hydrogen form.

The resulting $TiO_2$ was incorporated into vinyl asbestos tile by the above-defined procedure and, upon testing, found to have a brightness ($R_D$) of 43.0 and a yellowness ($B_L$) of 3.7.

EXAMPLE 6

To a hydroclassified slurry of rutile $TiO_2$ (700 parts) of 20 percent solids, 0.3 percent $Al_2O_3$ as aluminum sulfate, was added. The slurry was heated to 70° C. and neutralized to pH 7.0 with sodium hydroxide. After mixing 2 hours at 70° C. and filtering and washing, the sample was repulped at about 40 percent solids. Then 1.5 percent $SiO_2$ as silicic acid sol was added along with 0.1 percent each of triethanolamine and ethylhexoic acid. The silicic acid was prepared by passing "N" brand sodium silicate, diluted to an $SiO_2$ content of about 50 g./l. through a column of Dowex 50 ion exchange resin. The slurry was mixed 1 hour at 50° C. and filtered. After drying, the sample was twice passed through a 2-inch Reductionizer as in Example 1.

The sample was incorporated into vinyl asbestos, molded into tiles and analyzed for brightness and yellowness. It had a brightness ($R_D$) of 45.3 and a yellowness ($B_L$) of 3.2.

EXAMPLE 7

Sample A

To a hydroclassified slurry of rutile $TiO_2$ (700 g.) of about 20 percent solids, 0.3 percent $MgSO_4 \cdot 7H_2O$ and 0.2% $Al_2O_3$ as aluminum sulfate were added. Slurry was then heated to 70° C. and neutralized to 7.0 pH with sodium hydroxide. After mixing 2 hours at 70° C., filtering and washing the sample was repulped at about 40 percent solids and treated with 0.1 percent each of triethanolamine and ethylhexoic acid. The slurry was mixed 1 hour at 50° C. and filtered. After drying, the sample was given two passes through a 2-inch Reductionizer with steam at 500° F. and 120 p.s.i.g.

Sample B

Processed the same as (A) except 1.0 percent $SiO_2$ as ammonium silicate was added to repulp along with the triethanolamine and ethylhexoic acid.

Sample C

Processed the same as (A) except 2.0 percent $SiO_2$ as ammonium silicate was added to repulp along with triethanolamine and ethylhexoic acid. Results from an evaluation in vinyl asbestos tile were as follows:

| Sample | Percent $SiO_2$ | Percent $Al_2O_3$ | $SiO_2/Al_2O_3$ | Vinyl asbestos tile Hunter D-25 color diff. meter | |
|---|---|---|---|---|---|
| | | | | $R_D$ | $B_L$ |
| A | | 0.2 | | 55.7 | 1.7 |
| B | 1.0 | 0.2 | 5 | 56.0 | 1.4 |
| C | 2.0 | 0.2 | 10 | 55.9 | 1.3 |

The effect of the invention is to improve strength, brightness and blueness of tone.

We claim:

1. Pigmentary $TiO_2$ having enhanced physical properties with respect to brightness, color tone and ease of dispersibility comprising finely divided anhydrous $TiO_2$ containing a mixture of hydrous oxides of silicon and aluminum in a proportion such that at least about 5 weight parts of silica are used for each part of alumina and at least 0.5 parts of combined oxides are used for each 100 parts of untreated $TiO_2$.

2. A process for the preparation of the pigment of claim 1 which comprises treating a slurry of $TiO_2$ with an aqueous solution of an aluminum salt to give an acidic slurry which is neutralized and admixed with a silica containing material in a proportion such that at least about 5 weight parts of silica is present for each part of alumina whereby a mixture of hydrous oxides of silicon and aluminum is precipitated; conditioning the coated $TiO_2$ pigment by aging at a temperature ranging from 5° to 100° C. for a period up to about 24 hours; washing said conditioned pigment with water until it is substantially free of soluble salts; drying said pigment at an elevated temperature; and then milling said dried pigment until it has reached the desired degree of sub-division and is suitable for pigmentary usage.

3. The process of Claim 2 wherein the silica-containing material is an ammonium silicate.

4. The process of Claim 2 wherein the silica-containing material is a silicic acid.

* * * * *

UNITED STATES PATENT OFFICE
CERTIFICATE OF CORRECTION

Patent No. 3,658,566    Dated April 25, 1972

Inventor(s) SHEEHAN, GERARD MARTIN; ROBERTS, GEORGE LEATHWHITE, and DUPREE, PAUL MONTGOMERY It is certified that error appears in the above-identified patent and that said Letters Patent are hereby corrected as shown below:

Column 4, Table II, under title Yellow Factor (2A) should read -- 5.65 -- instead of "6.65"

Signed and sealed this 25th day of July 1972.

(SEAL)
Attest:

EDWARD M. FLETCHER, JR.
Attesting Officer

ROBERT GOTTSCHALK
Commissioner of Patents